United States Patent
De Lathauwer et al.

(10) Patent No.: US 12,108,705 B2
(45) Date of Patent: Oct. 8, 2024

(54) HEADER DRIVE MECHANISM FOR A COMBINE HARVESTER

(71) Applicant: CNH Industrial America LLC, New Holland, PA (US)

(72) Inventors: Tom A. De Lathauwer, Lede (BE); Frank R. G. Duquesne, Zwevegem (BE); Sam Reubens, Sint-Michiels (BE); Jean-Pierre Vandendriessche, Erpe-Mere (BE)

(73) Assignee: CNH Industrial America LLC, Holland, PA (US)

( * ) Notice: Subject to any disclaimer, the term of this patent is extended or adjusted under 35 U.S.C. 154(b) by 651 days.

(21) Appl. No.: 17/415,112

(22) PCT Filed: Dec. 17, 2019

(86) PCT No.: PCT/EP2019/085656
§ 371 (c)(1),
(2) Date: Jun. 17, 2021

(87) PCT Pub. No.: WO2020/127269
PCT Pub. Date: Jun. 25, 2020

(65) Prior Publication Data
US 2022/0053694 A1 Feb. 24, 2022

(30) Foreign Application Priority Data
Dec. 18, 2018 (EP) .................... 18213672

(51) Int. Cl.
*A01D 41/14* (2006.01)
*A01D 41/16* (2006.01)

(52) U.S. Cl.
CPC ........... *A01D 41/142* (2013.01); *A01D 41/16* (2013.01)

(58) Field of Classification Search
CPC ....... A01D 41/142; A01D 41/16; A01D 41/06
See application file for complete search history.

(56) References Cited

U.S. PATENT DOCUMENTS 5,743,872 A 4/1998 Kelly
6,510,680 B2 * 1/2003 Uhlending ........... A01D 75/287
56/16.2
(Continued)

FOREIGN PATENT DOCUMENTS

DE 3431549 C1 3/1986
EP 1382237 A1 1/2004
(Continued)

OTHER PUBLICATIONS

International Search Report and Written Opinion for International Application No. PCT/EP2019/085656, dated Mar. 20, 2020, 8 pages.
(Continued)

*Primary Examiner* — Abigail A Risic
(74) *Attorney, Agent, or Firm* — Peter K. Zacharias; Rebecca L. Henkel; Rickard K. DeMille

(57) ABSTRACT

In a combine harvester, the forward-directed driveline from the combine is coupled to the transversely oriented header drive axle through a transverse gearbox that is mounted on a moveable cradle frame onto which the header is mounted. In addition, the housing of the gearbox or at least the portion of the housing including the input axle of the gearbox is rotatably arranged relative to the cradle frame, about a rotation axis oriented transversely to the combine's forward direction. A mechanical link is furthermore provided between the rotatable gearbox housing (portion) and the feeder housing, configured to control the orientation of the
(Continued)

input axle of the transverse gearbox, so as to maintain the alignment of the input axle relative to the driveline of the combine.

7 Claims, 3 Drawing Sheets

(56) References Cited

U.S. PATENT DOCUMENTS

| | | |
|---|---|---|
| 7,234,291 B2 | 6/2007 | Rikert |
| 7,552,578 B2* | 6/2009 | Guske .................. A01B 71/063 56/16.3 |
| 2004/0163374 A1* | 8/2004 | Rickert ................ A01D 41/142 56/16.4 R |
| 2008/0006014 A1 | 1/2008 | Guske |
| 2016/0044870 A1* | 2/2016 | Mayerle .................. A01F 12/40 460/112 |
| 2016/0150716 A1* | 6/2016 | De Coninck .......... A01D 41/16 56/153 |
| 2018/0168102 A1* | 6/2018 | Saraiva .................. A01D 41/16 |
| 2019/0090422 A1* | 3/2019 | Deevy .................. A01D 41/142 |
| 2023/0030760 A1* | 2/2023 | Beschorn ............. A01D 41/141 |
| 2023/0345873 A1* | 11/2023 | Goossens ............ G01M 13/028 |

FOREIGN PATENT DOCUMENTS

| | | |
|---|---|---|
| EP | 1440617 A1 | 7/2004 |
| EP | 2055172 A2 | 5/2009 |
| WO | 2011095525 A1 | 8/2011 |

OTHER PUBLICATIONS

Extended European Search Report for European Application No. 18213672.1, dated Jul. 30, 2019, 4 pages.

* cited by examiner

HEADER DRIVE MECHANISM FOR A COMBINE HARVESTER

CROSS-REFERENCE TO RELATED APPLICATIONS

This application is a U.S. national phase application filed under 35 U.S.C. § 371, claiming benefit to International Patent Application No. PCT/EP2019/085656, filed Dec. 17, 2019, which is related to, and claims the benefit of priority from, European Patent Application No. 18213672.1, filed Dec. 18, 2018, the contents of each of which are incorporated herein by reference in their entirety for all purposes.

Field of the Invention

The present invention is related to combine harvesters, in particular to the driveline for actuating the operation of the header of the combine.

BACKGROUND OF THE INVENTION

Agricultural combine harvesters are machines designed for harvesting and processing crops such as wheat or corn. Crops are cut from the field on a wide area by the header mounted at the front of the combine. By an auger or a belt system included in the header, the harvested material is brought to a central area of the header, and from there it is transported by the feeder to a threshing mechanism comprising laterally or longitudinally mounted threshing rotors and further to the cleaning section comprising a number of sieves where grains are separated from any remaining crop residue.

The header is suspended on a cradle frame attached at the front of the feeder. In modern combines, this cradle frame is movable with respect to the feeder housing in order to allow a freedom of movement to the header during the harvesting operation. The cradle frame is usually configured so that a pivoting motion is allowed both around a horizontal axis that is perpendicular to the longitudinal axis of the harvester and about a second axis parallel to said longitudinal axis. The first degree of freedom allows the cradle and thereby the header to be tilted forward or backward relative to the feeder housing, while the second allows a lateral flotation of the header.

A known way of operationally coupling the header to the combine utilises a driveline from the combine's power source to the header which passes along one side of the feeder where it is coupled to a drive axle on the header through a transverse gearbox, configured to transfer the rotation of the driveline oriented in the forward direction of the combine to a rotation of the header drive axle oriented transversally to said forward direction. In presently known systems of this type, the transverse gearbox is bolted to the side of the feeder, which requires a complex rotational connection between the gearbox and the header's drive axle in order to allow the header to undergo the above-described movements relative to the feeder. The angular range of said rotational connection however limits the amplitude of the header's movements, especially when both degrees of freedom, tilting and lateral flotation, are simultaneously available. As combines increase in size and as the requirements in terms of the header movement increase, the existing mechanism is therefore no longer sustainable.

SUMMARY OF THE INVENTION

The present invention is related to a combine harvester in accordance with the appended claims. In a harvester according to the invention, a forward-directed driveline of the combine is coupled to a transversely oriented header drive axle through a transverse gearbox that is mounted on the cradle frame. In addition, the housing of the gearbox or at least the portion of the housing comprising the input axle of the gearbox is rotatably arranged relative to the cradle frame, about a rotation axis oriented transversely to the combine's forward direction. A mechanical link is furthermore provided between the rotatable gearbox housing or rotatable housing portion and the feeder housing, configured to control the orientation of the input axle of the transverse gearbox, so as to maintain the alignment of said input axle relative to the driveline of the combine. This mechanism is advantageous in that no universal joint is required between the output axle of the gearbox and the header drive axle, thereby increasing the freedom of movement of the cradle frame and thereby of the header, relative to the feeder housing.

DETAILED DESCRIPTION OF PREFERRED EMBODIMENTS OF THE INVENTION

Preferred embodiments will now be described with reference to the drawings. The detailed description is not limiting the scope of the invention, which is defined only by the appended claims. The terms 'front' and 'back' or 'rear' are referenced to the front and back side of the combine harvester. The 'forward direction' of the combine harvester refers not to a single geometrical axis but to the general direction from the rear of the vehicle to the front.

Figure 1:
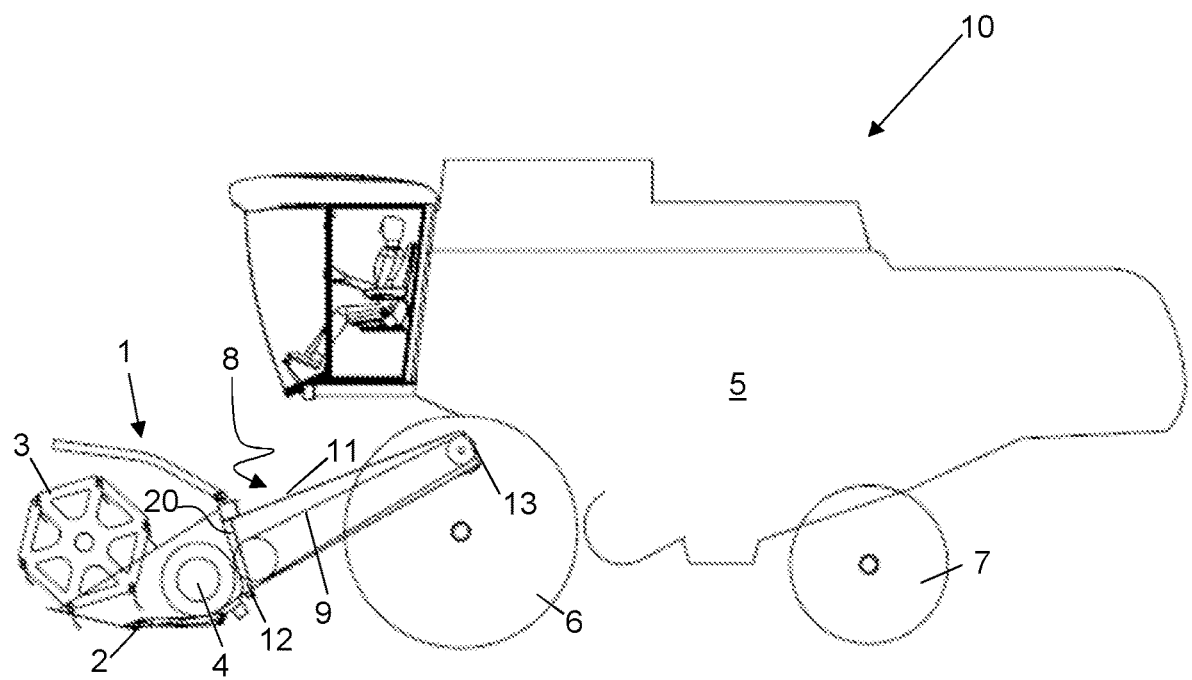
FIG. 1 is a schematic side view of a combine header as known in the art, indicating the position of the header and the feeder at the front of the machine.

FIG. 1 is a schematic image of a combine harvester 10 as known today, comprising a header 1 mounted at the front of the combine. The header comprises knives 2 maintained at a given height above ground level while the combine moves through a field of crops that are to be harvested. A rotating reel 3 guides the crops towards the knives. Cut crops are transported from both lateral sides of the header towards a central area by an auger 4. The main body 5 of the combine is supported by front and rear wheels 6 and 7 and comprises the threshing rotors and cleaning section generally known by the skilled reader and not depicted as such in FIG. 1. From the central area of the header 1, crops are transported into the main body 5 of the combine by a feeder 8. The feeder 8 is inclined upwards from the header 1 towards the main body 5 and comprises moving belts 9 inside a housing 11. The belts transport the crops upwards, from an inlet section 12 of the feeder to an outlet section 13. At the front of the feeder, a cradle frame 20 is attached, onto which the header 1 is mounted and secured. As described in the introductory portion, the cradle frame 20 is movable relative to the feeder 8. The cradle frame may at least be pivotable about a tilting axis for tilting the header forward or backward, and preferably also about a longitudinal axis for allowing the header to undergo a lateral flotation. These movements are controlled by actuators (not shown) mounted between the feeder housing 8 and the cradle frame 20. The rotation of the reel 3 and the auger 4 is driven by a header drive axle which is itself rotatably coupled to the driveline of the combine as described in the introductory portion.

Figure 2:
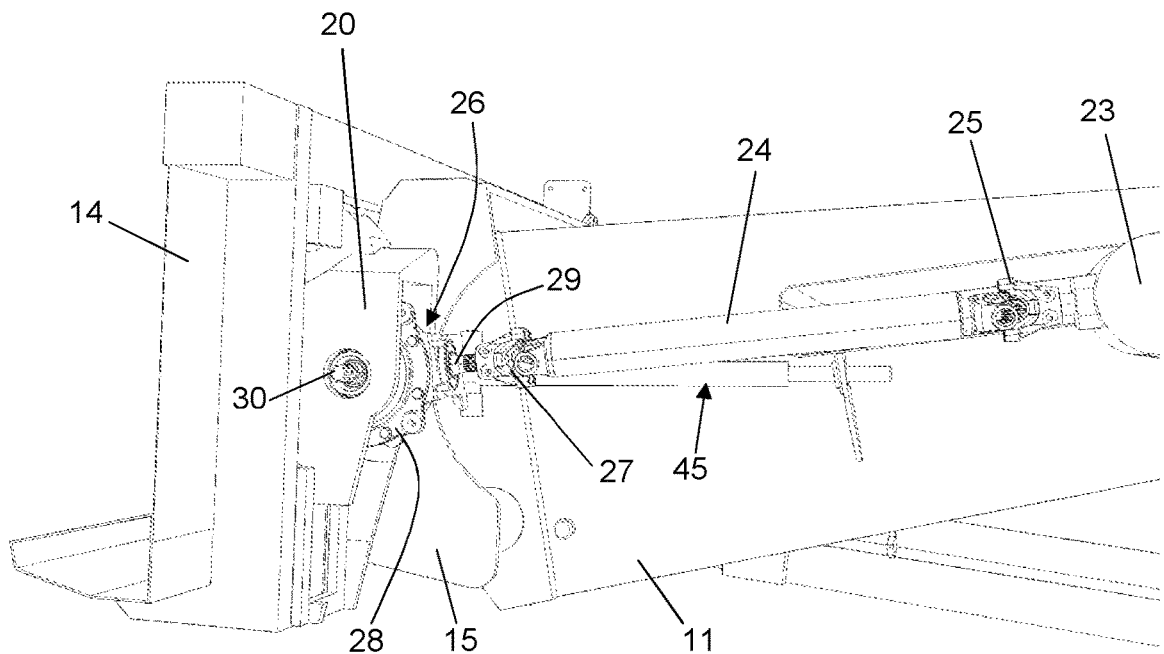
FIG. 2 shows a header drive mechanism in a combine harvester according to a preferred embodiment of the invention.

FIG. 2 shows a detail of the left-hand side of the feeder housing 11, in a combine harvester according to a preferred embodiment of the invention. The header frame 14 and the cradle frame 20 are visible in the drawing. The header frame 14 is the portion of the header that is directly attached to the cradle frame 20. The cradle frame 20 is mounted on a front structure 15 of the feeder. A gearbox 23 is fixedly attached, for example bolted to the sidewall of the feeder housing 11, in the vicinity of the feeder's outlet section. A drive axle 24 that is extendable in length is coupled to the fixed gearbox 23 by a first universal joint 25. At its opposite end, the drive axle 24 is coupled to a transverse gearbox 26 by a second universal joint 27. The transverse gearbox 26 comprises a gearbox housing 28, an input axle 29 coupled to the second universal joint 27 and an output axle 30 oriented transversely, preferably orthogonally, with respect to the input axle 29. The transverse gearbox 26 as such may operate according to known principles and techniques. Inside the gearbox housing 28 is a gear mechanism operating in the presence of a lubricant. The gear mechanism may comprise a larger bevel gear coupled to the output axle 30 and a smaller bevel gear (pinion gear) coupled to the input axle 29. The position of the input and output axles 29/30 is fixed relative to the gearbox housing 28.

In the terminology of the appended claims, the drive axle 24, universal joints 25 and 27 and the fixed gearbox 23 are part of the driveline configured to drive the rotation of the header's drive axle (not shown in FIG. 2) when said header drive axle is coupled to the output axle 30 of the transverse gearbox 26. The driveline may further comprise, to the opposite side of the fixed gearbox 23, a plurality of axles interconnected by universal joints, as well as further gearboxes, and is rotatably driven by a power source of the combine, usually a hydraulic motor.

Figure 3:
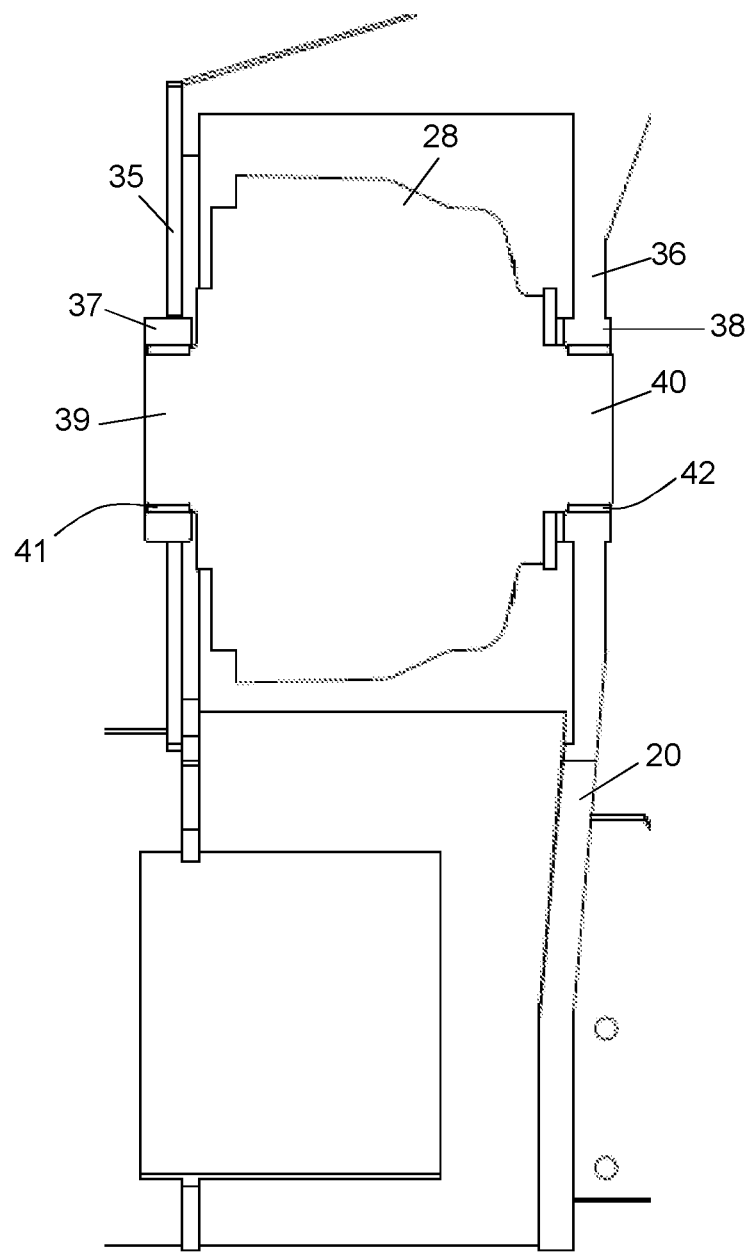
FIG. 3 is a section view of a rotatable transverse gearbox in a combine harvester according to an embodiment of the invention.

A characteristic feature of the embodiment shown in FIG. 2 is that the gearbox housing 28 of the transverse gearbox 26 is rotatably mounted on the cradle frame 20. The housing 28 is rotatable relative to the cradle frame 11, about an axis that is transversely oriented with respect to the drive axle 24. Preferably but not necessarily, the rotation axis of the gearbox housing 28 coincides with the axis of the gearbox's output axle 30. FIG. 3 shows a section view, indicating how the gearbox 26 may be mounted relative to the cradle frame 20. The gearbox housing 28 is held between two sidewalls 35 and 36 of a support bracket that is fixedly attached or uniform with the cradle frame 20. The sidewalls comprise bushings 37 and 38 and the gearbox housing is provided with machined cylindrical surfaces 39 and 40 which match with the bushings, preferably with bearings 41 and 42 such as sliding bearings or roller bearings between the bushings and the cylindrical surfaces.

Figure 4:
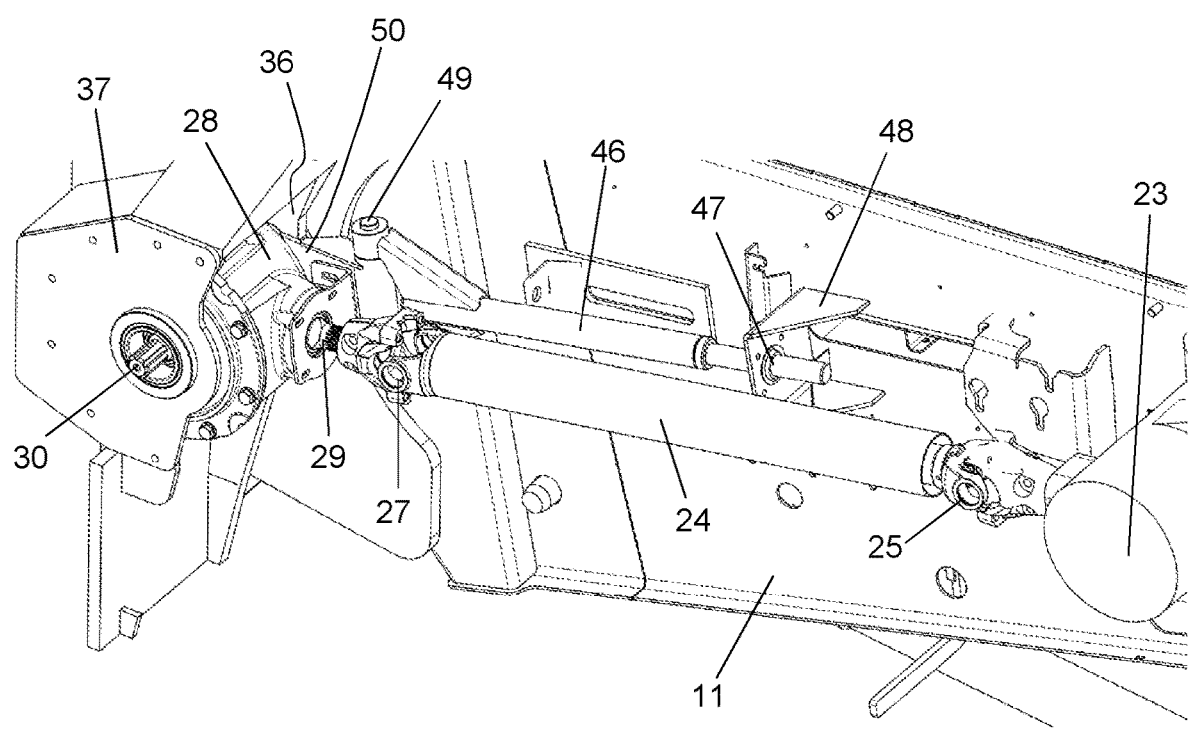
FIG. 4 more detailed view of the mechanism of FIG. 2.

In order to maintain the gearbox 26 in a position where its input axle 29 faces the fixed gearbox 23, a mechanical link 45 is furthermore provided adjacent the extendable drive axle 24, between the feeder housing 11 and the transverse gearbox housing 28. As seen in FIG. 4, the mechanical link 45 comprises an extendable shaft 46, i.e. a shaft of variable length having a first and second part which can slide relative to each other. At one end, the shaft 46 is connected through a ball joint 47 to a support bracket 48 that is bolted or welded to the feeder housing 11. At the opposite end, the shaft 46 is connected to the gearbox housing 28 through a pivot 49 defined by a pivot axis oriented upward and transverse relative to the gearbox's input and output axles 29 and 30. In the embodiment shown, the pivot 49 is mounted at the end of a support plate 50 fixedly attached to the gearbox housing. The sidewalls 36 and 37 between which the gearbox housing is rotatably mounted are equally visible in FIG. 2.

The degrees of freedom provided to the mechanical link 45 by the extendable shaft 46, the ball joint 47 and the pivot 49, enable the mechanical link's function of maintaining the transverse gearbox 26 in proper alignment with the drive axle 24, regardless of the position of the cradle frame 20 relative to the feeder housing 11. As the gearbox 26 is mounted on the cradle frame, no complex rotational connection is required between the header drive axle and the output axle of the gearbox. The mechanism thereby allows a significant range of header movements relative to the feeder, such as the forward and backward tilting movement and the sideways flotation, while the rotational coupling between the driveline and the header drive axle remains assured.

The above-described embodiment is not limiting the scope of the present invention, and variations to certain features are possible without departing from the scope. The way in which the mechanical link is brought into practice may differ from the one shown, and the functionality of this link is sufficient to allow the skilled person to devise alternative realisations of the link, which may also depend on the degrees of freedom of movement of the header relative to the feeder. The embodiment shown in FIG. 2 allows forward and backward tilting as well as floatation of the header, but even in this design, some elements may be replaced by equivalent means. For example, the pivot 29 could be replaced by a flexible coupling between the end of the extendable shaft 46 and the gearbox housing 28. The flexible coupling may for example comprise a resilient element with sufficient flexibility for allowing the header movement, and with sufficient stiffness for controlling the position of the transverse gearbox 26.

As stated, the rotation axis of the gearbox housing 28 in the embodiment of FIGS. 2 and 4 coincides with the rotation axis of the output axle 30 of the gearbox 26. This is an advantageous embodiment because it facilitates the coupling of the header drive axle to the gearbox 26. This header drive axle may be directly coupled to the output axle 30 through a suitable coupling mechanism. The invention is however not limited to this particular embodiment and the rotation axis of the gearbox housing 28 may be separate from the rotation axis of the output axle 30. This may be required or advantageous for allowing a particular degree of movement to the header relative to the feeder. It will however require a more complex coupling mechanism between the header drive axle and the gearbox 26.

According to an alternative embodiment, the transverse gearbox comprises a split housing, one portion of which is fixedly attached to the cradle frame 20, while the other portion is rotatable relative to the fixed portion and to the cradle frame. According to an embodiment, the fixed portion comprises a large output bevel gear coupled to the gearbox's output axle 30, while the rotatable portion comprises an input pinion gear coupled to the gearbox' input axle. The rotatable portion is rotatable about the output axis of the gearbox. The mechanical link is mounted between the rotatable gearbox housing portion and the feeder housing, in the same manner as described in relation to the embodiment of FIG. 2. Provided that adequate sealing is produced between the gearbox housing portions, this setup is fully equivalent to the embodiments described above.

According to an embodiment, a single header drive axle is present on one side of the combine, as shown in the drawings, i.e. a single rotatable transverse gearbox 26 is required. The mechanism of the invention may however also be provided on both sides of the combine harvester, when the header comprises drive axles on both sides.

The invention claimed is:

1. A combine harvester comprising:
a feeder at the front of the harvester, the feeder comprising a housing, an input section and an output section,
a cradle frame that is movably attached at the front of the feeder, wherein the cradle frame is configured to receive a header comprising a header drive axle oriented transversely to the forward direction of the harvester when the header is coupled to the feeder,
a driveline, at least a portion of which is running alongside the feeder housing,
a transverse gearbox for transferring a rotation of the driveline to a rotation of the header drive axle, the gearbox comprising a gear mechanism mounted in a gearbox housing, a input axle coupled to the driveline and an output axle configured to be coupled to the header drive axle,
wherein at least a portion of the housing of the transverse gearbox is rotatably mounted on the cradle frame, the housing or housing portion being rotatable about an axis that is oriented transversely relative to the driveline,
wherein the combine harvester further comprises a mechanical link is coupled between the feeder housing and the rotatable gearbox housing or housing portion, wherein the mechanical link is configured to control the orientation of the input axle of the gearbox, regardless of the position of the cradle frame relative to the feeder.

2. The combine header according to claim 1, wherein the mechanical link comprises a shaft of extendable length, a ball joint fixed to the feeder housing and a flexible coupling, wherein the shaft is connected at one side to the ball joint and connected at the other side to the flexible coupling mounted between the shaft and the rotatable gearbox housing or housing portion.

3. The combine header according to claim 2, wherein the flexible coupling comprises a pivot defined by a pivot axis that is transversely oriented with respect to both the input axle and the output axle of the transverse gearbox.

4. The combine header according to claim 1, wherein the rotation axis of the housing or housing portion of the transverse gearbox relative to the cradle frame coincides with the rotation axis of the output axle of said gearbox.

5. The combine header according to claim 1, wherein the driveline comprises a gearbox that is fixedly attached to the feeder housing, and a drive axle of variable length coupled at one end to said fixed gearbox by a first universal joint and at the opposite end to the input axle of the transverse gearbox, by a second universal joint.

6. The combine header according to claim 1, wherein the housing of the transverse gearbox is rotatable as a whole relative to the cradle frame, and wherein said housing is provided with cylindrical surfaces mounted rotatably inside bushings provided in a pair of sidewalls of a support bracket that is fixedly attached to or uniform with the cradle frame, with a set of bearings mounted between the bushings and the cylindrical surfaces.

7. The combine header according to claim 1, wherein the transverse gearbox comprises a split housing, comprising a first housing portion that is fixedly attached to the cradle frame and a second housing portion that is rotatable relative to the first housing portion, the second housing portion comprising the input axle of the transverse gearbox.

* * * * *